United States Patent [19]

Müller

[11] 4,090,364
[45] May 23, 1978

[54] MOUNTING DEVICE FOR FIXEDLY FASTENING A PILE TO A SHEET PILING

[76] Inventor: Günther Müller, Unter dem Gedankenspiel 32, 3550 Marburg, Lahn, Germany

[21] Appl. No.: 772,640

[22] Filed: Feb. 28, 1977

[30] Foreign Application Priority Data

Mar. 6, 1976 Germany .............................. 2609402

[51] Int. Cl.² .............................................. E02D 5/74
[52] U.S. Cl. ......................................... 61/39; 52/146; 61/58; 403/198; 403/201
[58] Field of Search ..................... 61/39, 49, 63, 58; 52/146, 152; 403/198, 201, 194, 244, 245

[56] References Cited

U.S. PATENT DOCUMENTS

| 2,456,055 | 12/1948 | Farrar | 403/406 |
|---|---|---|---|
| 3,236,054 | 2/1966 | Northrup | 61/39 |

FOREIGN PATENT DOCUMENTS

| 1,388,765 | 4/1965 | France | 403/201 |
|---|---|---|---|
| 2,256,984 | 11/1972 | Germany | 61/58 |
| 403,207 | 6/1966 | Switzerland | 403/261 |
| 950,644 | 2/1964 | United Kingdom | 403/194 |

*Primary Examiner*—Paul R. Gilliam
*Assistant Examiner*—Alex Grosz
*Attorney, Agent, or Firm*—Hane, Roberts, Spiecens & Cohen

[57] ABSTRACT

A beam-type pile such as a double-T beam is secured to a sheet piling after driving a pile into the ground in a usually slanted position. The pile is secured to the sheet piling by welding a pull bar to the web of the pile so as to protrude from the head thereof. The protruding pull bar portion is partly inserted into a cutout of the sheet piling. This protruding pull bar portion is secured in the sheet piling by a support plate including a slot through which the pull bar portion is extended. The support plate is welded to the inside wall surface. The pull bar portion protruding into the sheet piling is further fastened by a reinforcing plate disposed upright relative to the protruding pull bar position and welded thereto and the support plate.

15 Claims, 7 Drawing Figures

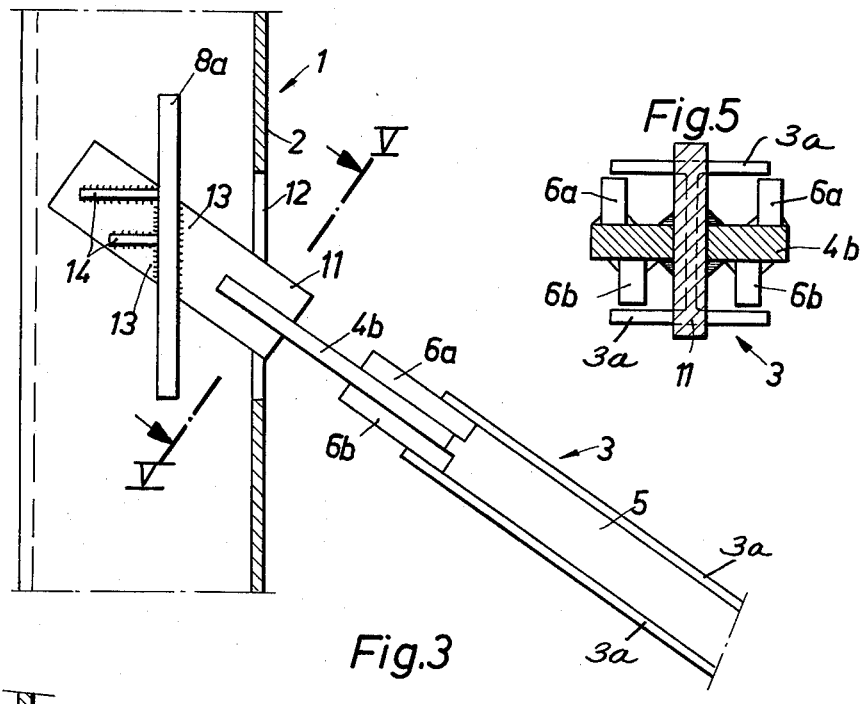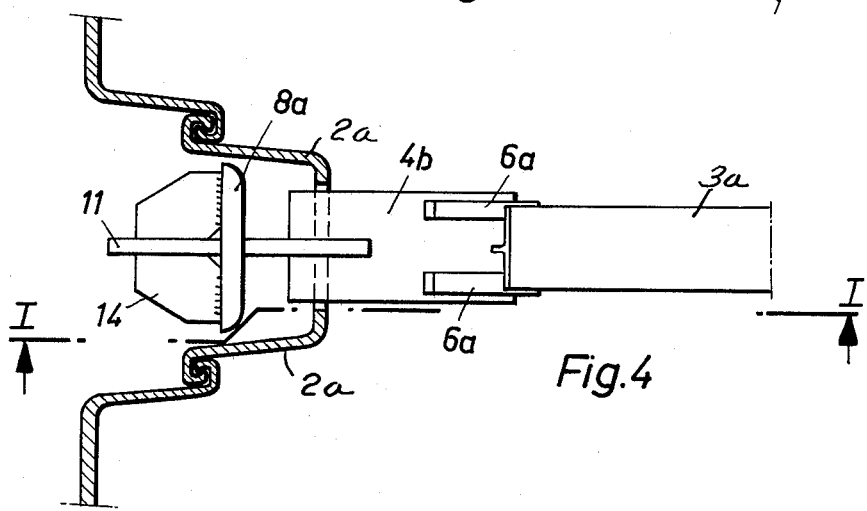

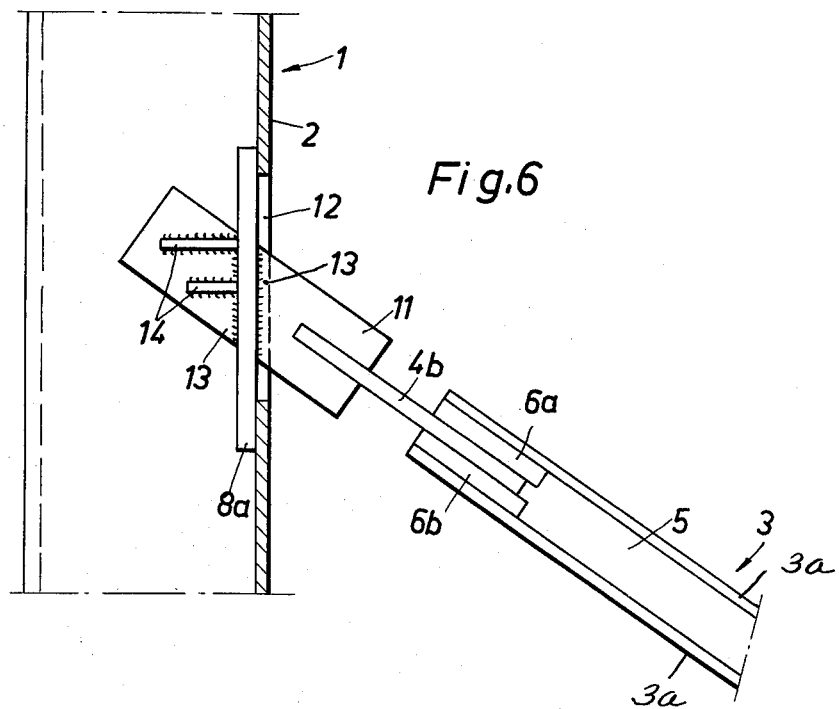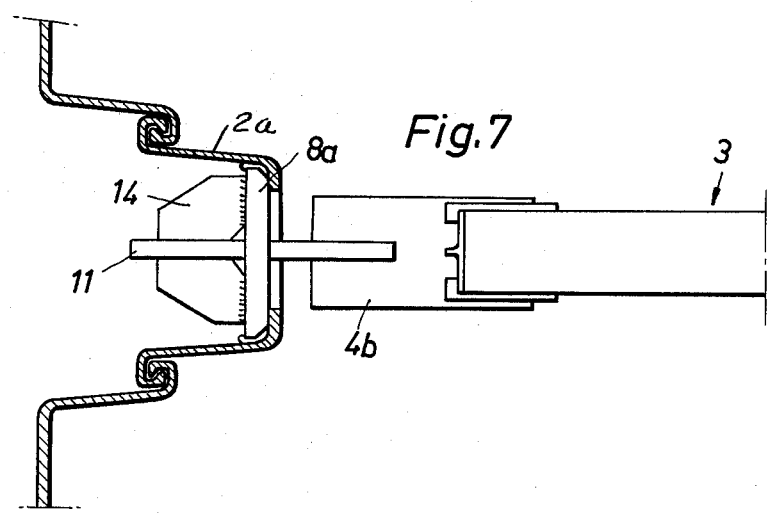

MOUNTING DEVICE FOR FIXEDLY FASTENING A PILE TO A SHEET PILING

The present invention relates to a mounting device for fixedly securing a pile to a sheet piling and, more particularly, to a structural unit which can be secured to the pile prior to fixedly fastening the same to the sheet piling.

BACKGROUND

It is known in general practice to reinforce a sheet piling by securing thereto piles usually in a slanted position. It is also known to use for the purpose a pull bar or strap which is generally plate-shaped and slotted. The bar is welded to the web of a double-T beam or T-beam used as reinforcing piles so that it protrudes from the head of the pile to be fastened. Fastening of the pull bar to the web of the beam is effected by welding to the web by support portions protruding from and secured to the pull.

It is also known to effect mounting of the pull bar on the spar flange of a sheet piling made of steel. In such arrangement, the pull bar is welded to the sheet material of the sheet piling. All the mounting parts which are used and needed to sustain the pull forces acting upon the pile and also the vertical forces as are caused by the slant of the piles which are to be secured to the sheet piling must be welded in situ to the pull bar and the construction parts to be mounted.

THE INVENTION

It is a broad object of the invention to provide a novel and improved mounting device for a pile to be fixedly secured to a sheet piling by means of a pull bar or strap which device makes it possible to secure the pull bar to the pile so that most of the required welding operations can be made in the plant and only relatively simple and few welding operations need to be made in situ. Obviously, welding operations are much more difficult to carry out in situ than they are in the plant. The problem of complex welding operations in situ has long concerned the industry. Attention is directed to assignee's prior U.S. Pat. No. 4,003,207 which relates to the same problem. The present invention further increases the possibility of welding in the plant rather than in situ.

SUMMARY OF THE INVENTION

The afore-pointed objects, features and advantages of the invention and other objects, features and advantages which will be pointed out hereinafter are obtained by arranging the pull bar so that it extends through a cutout in the sheet pile and that the pull bar is provided with a support plate secured thereto. This support plate, in turn, abuts against a wall portion of the sheet pile. Preferably, the support plate is provided with a slot into which the pull bar is inserted.

According to a preferred embodiment of the invention, the pull bar is provided with a joining plate extending through the cutout in the sheet pile. This joining plate is disposed crosswise relative the pull bar, preferably normal thereto and is secured to the support plate. The support plate is provided with a slot into which the joining plate is inserted and then welded to the support plate.

The aforementioned embodiments of the invention have the advantage that the entire mounting device, together with the pull bar, can be constructed as a structural unit which can be inserted into the afore-referred to cutout in the sheet pile. After such insertion of the structural unit, the welding work on the pile outside of the sheet pile can be carried out in a very simple manner.

The mounting device of the invention also produces an elastically bendable connection between the pile used for strengthening the sheet piling as the pull bar in the portion outside of the sheet piling constitutes a quasi-elastic hinge as the portion of the bar outside of the sheet pile acts as a bendable axis.

BRIEF DESCRIPTION OF THE DRAWING

There are shown several embodiments of a mounting device for fixedly securing a reinforcing pile to a sheet piling according to the invention by way of illustration and not by way of limitation.

IN THE DRAWING

Figure 1:
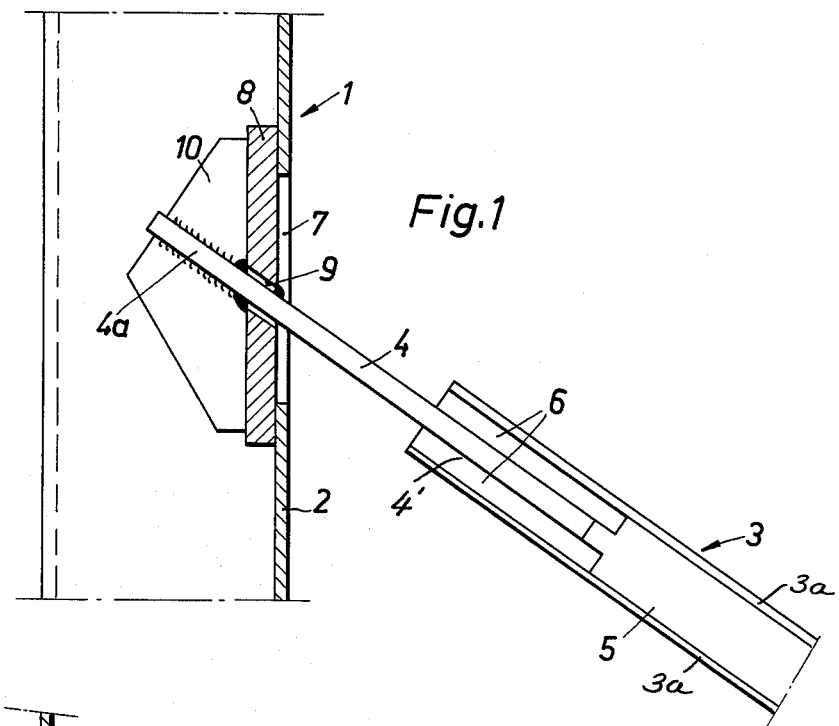
Figure 2:
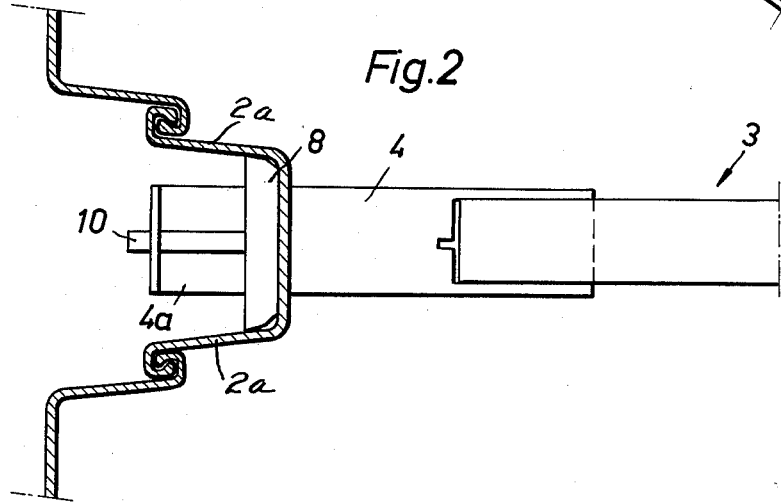

FIG. 1 is an elevational partly sectional view of the device according to the invention;

FIG. 2 is a top view of FIG. 1;

FIG. 3 is a modification of the mounting device according to the invention, showing an elevational view of the device, partly in section, in which the device is extended through a cutout in a hollow protrusion of one of the sheet piles forming the sheet piling;

FIG. 4 is a top view of FIG. 3;

FIG. 5 is a section taken along line V—V of FIG. 3;

FIG. 6 is an elevational view, partly in section, showing the device according to FIGS. 3, 4 and 5 mounted on the sheet pile; and FIG. 7 is a top view of FIG. 6.

DETAILED DESCRIPTION OF THE DRAWING

Referring now to the figures in greater detail, and first to FIGS. 1 and 2, there is shown in FIG. 1 a sheet piling 1 and, more specifically, one of the sheet piles 2 constituting the sheet piling. The sheet piling is anchored and steadied by means of piles 3, for instance piles such as a double-T beam having cross arms 3a or a T-beam. This pile is secured to the sheet piling by means of a lengthwise slotted plate-shaped pull bar or strap 4. The web 5 of the double-T beam is inserted into the slot 4' of the pull bar. The pull bar is fixedly secured, for instance, by welding to it bars 6 which, in turn, are fixedly secured to crossbars 3a of the double-T beam, for instance by welding.

The pull bar 4 is extended through a cutout 7 in a hollow protrusion 2a of sheet pile 2. The portion 4a of the pull bar 4 which is located in the protrusion 2a of the sheet pile 2 mounts a support plate 8 which abuts against the flat outside wall of the protrusion. This support plate is suitably secured to that pile part, for instance by welding.

As shown in FIGS. 1 and 2, the pull bar extends through a slot 9 in a support plate 8. Moreover, it is fixedly secured, for instance by welding, to a reinforcement plate 10 which is disposed about vertically relative to the pull bar and abuts against the support plate 8. The reinforcement plate 10 is inserted into a slot provided in the portion 4a of the pull bar extending into the protrusion 2a of the sheet pile 2 and is also fixedly secured to the pull bar, for instance by welding.

In the structure shown in FIGS. 1 and 2, the support plate 8, together with the pull bar 4 and the reinforcement plate 10 can be inserted into the slot 7 as a prefabricated structural unit. After such insertion, the welding of the bar portions 6 on the pull bar can be secured to the pile 3 proper. After so securing of the aforedescribed structural unit, the support plate 8 can be welded to the sheet pile 2, thus completing mounting of pile 3 to the sheet piling.

According to the modification of the invention as shown in FIGS. 3 and 4, the fastening of pile 3 to the sheet piling is effected by a slotted plate-shaped pull bar 4b. The web 5 of the double-T beam is inserted into the slot in pull bar 4b and the bar 4b is then fixedly secured by means of the bars or strips 6a and 6b, which in turn are secured by the cross arms 3a to the beam 3, for instance by welding as is shown in FIG. 5.

In addition, the pull bar 4b mounts a joining plate 11 which is inserted into a slot in the pull bar 4b and is fixedly secured, for instance by welding, to the pull bar. As a result, the joining plate 11 is disposed crosswise of the pull bar 4b and approximately parallel to the inner wall side of the sheet pile 2.

The joining plate 11 extends through cutout 12 of the sheet pile 2. There is also provided a support plate 8a which has a slot through which the joining plate 11 extends. The joining plate is welded at 13 to the support plate 8a to which are further welded reinforcement bars 14 which, in turn, are welded to the joining plate 11.

As it is now apparent, FIGS. 3 and 4 show the pull bar 4b together with the joining plate 11, support plate 8a and the reinforcement bars 14 as constituting a structural unit ready for insertion through the cutout 12 into the sheet pile 2.

FIGS. 6 and 7 show the structural unit consisting of the pull bar 4b, the support plate 8a, the joining plate 11 and the reinforcement bars 14 according to FIGS. 3, 4 and 5 in the mounted position.

To install the structural unit according to FIGS. 3, 4 and 5, the pull bar 4b to which are secured the support plate, the joining plate and the reinforcement bars, together with the bar portions 6a and 6b, are first inserted into the cutout 12 in the sheet pile 2 and slipped upon the web 5 of the double-T beam 3. The slotted portion of the pull bar 4b then overlies the web 5 of the double-T beam. The pull bar 4b is inserted into sheet pile 2 so that the support plate 8a is located in the protrusion formed in the sheet pile 2 and in contact with the inner wall of the protrusion. Subsequently, the pull bar 4b is welded by means of the bar portions 6a and 6b to the double-T beam and the support plate 8a is also welded to the sheet pile 2 and, more particularly, to the inside wall of the protrusion, thereby completing the mounting of the pile 3 to the sheet piling.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

I claim:

1. A force-transmitting device for securing a pile to an erected sheet piling for stabilizing the same in its position, said device comprising in combination: a pile to be secured at one end to a sheet piling, and a sheet piling having on its side to be secured to the pile a hollow protrusion including a cut-out on its outwardly facing side, said protrusion defining a space within the sheet piling; a pull bar extending at one end through said cut-out into said space, and a support member fixedly secured to said end of the pull bar and disposed within said protrusion and abutting against the adjacent inside wall surface of the sheet piling fixedly secured to said wall surface, the other end of the pull bar being fixedly secured to said pile.

2. The device according to claim 1 and comprising a joining plate secured to said pull bar in a position in which the joining plate extends into said cutout, said joining plate being disposed substantially crosswise of the pull bar and secured to the support member.

3. The device according to claim 2 wherein said support member comprises a support plate including a slot, said joining plate being inserted into said slot and welded to said support plate.

4. The device according to claim 3 and comprising at least one reinforcement bar disposed between the support plate and the joining plate, said bar being fixedly secured to both said plates.

5. The device according to claim 1 wherein said support member comprises a plate including a slot, said pull bar being inserted into said slot, and further compring a reinforcing plate secured to the pull bar substantially normal thereto.

6. The device according to claim 5 wherein the pull bar has a slot and said reinforcement plate is inserted into the slot in the pull bar.

7. A mounting device for securing a beam-type pile having a web to a sheet piling including a cutout defining a space within the sheet piling, said mounting device comprising: an elongate pull bar having at one end a lengthwise slot for fitting the pull bar upon the web of the beam, the length of the pull bar and the slot therein being so correlated that the pull bar protrudes from the head of the pile when fitted upon the web; a support plate secured to said protruding portion of the pull bar; and a reinforcing means secured to the pull bar and the support plate.

8. The mounting device according to claim 7 wherein a mounting bar is secured to the pull bar at least on one side thereof and lengthwise of the slot in the pull bar for securing the pull bar to the web.

9. The mounting device according to claim 7 wherein said reinforcing means comprise a plate welded to the pull bar and the support plate.

10. A fastening device for securing a beam-type pile to one side of an erected sheet piling for stabilizing the same, said device comprising in combination: a sheet piling having on one side a cut-out providing a space within the sheet piling; and a structural unit for securing the pile to the sheet piling, said structural unit including an elongate pull bar, mounting means at one end of the pull bar for fixedly securing said end of the pull bar to the pile, a support member fixedly secured to the other end of the pull bar and extending at an angle from said bar, and a reinforcement member secured to the support member and the pull bar, the dimensions and shapes of said space within the sheet piling and of said structural units being so correlated that said support member and said reinforcement member are insertable into said space for attachment to a wall portion of the sheet piling within said space.

11. The fastening device according to claim 10 wherein said mounting means comprise mounting bars (6) lengthwise secured to the beam type pile and to said one end of the pull bar, and wherein said support member is a plate (10) fixedly secured to said other end of the pull bar and said reinforcement member is a plate (8) fixedly secured to the support plate and positioned to be parallel to a wall of the sheet piling upon insertion of the support member and the reinforcement member into said space within the sheet piling.

12. The fastening device according to claim 11 wherein said cut-out in the sheet piling is defined by a hollow protrusion extending from one side of the sheet piling and having a wall portion parallel to the respective side of the sheet piling, the reinforcement plate (8) being attachable to the inside of said wall portion parallel thereto.

13. The fastening device according to claim 10 wherein said pull bar is slotted at said other end, and wherein said support member comprises a plate (11) inserted into said slotted end of the pull bar and fixedly secured to the pull bar, and said reinforcement member comprises a plate (8a) fixedly secured to said support plate (11) at an angle therewith and parallel to a wall portion within the space in the sheet piling.

14. The fastening device according to claim 13 and comprising a further reinforcement member (14) fixedly secured to said support member and said reinforcement member.

15. The fastening device according to claim 13 wherein said reinforcement plate (8a) is fixedly secured to an inside wall portion of said protrusion parallel to said inner wall portion.

* * * * *